Dec. 29, 1942.  A. G. RINDERKNECH  2,306,468
CORN CRIB OR THE LIKE
Filed Feb. 20, 1940  4 Sheets-Sheet 2
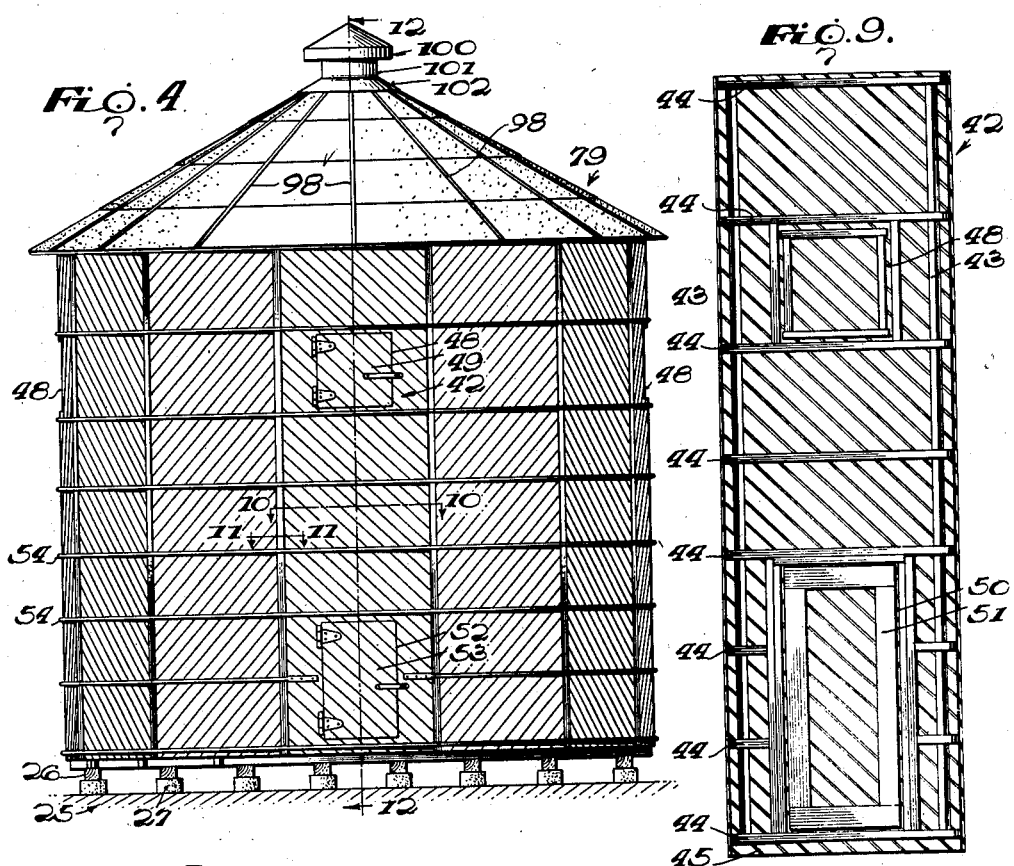
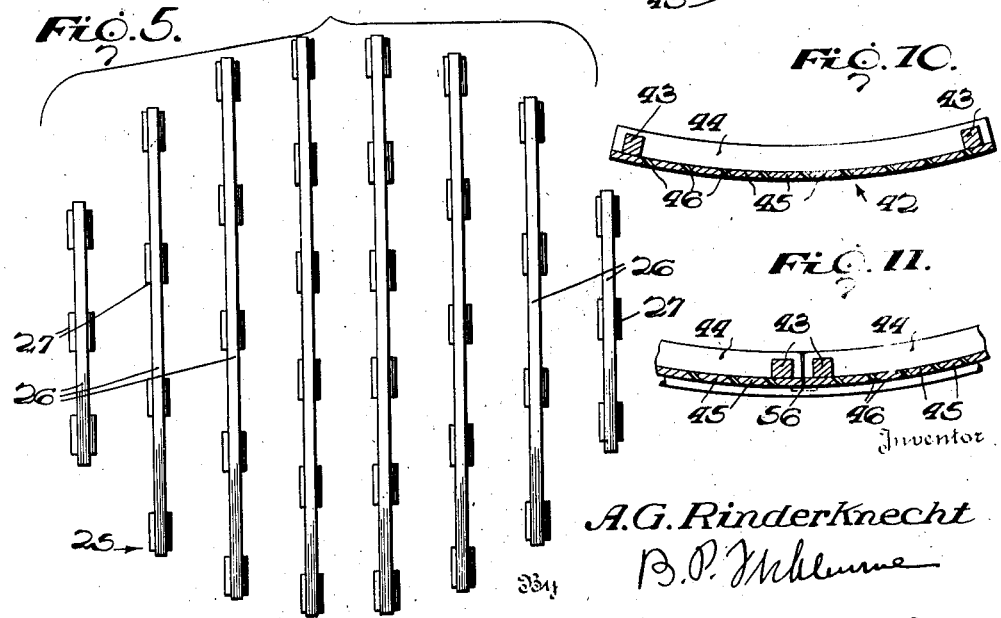

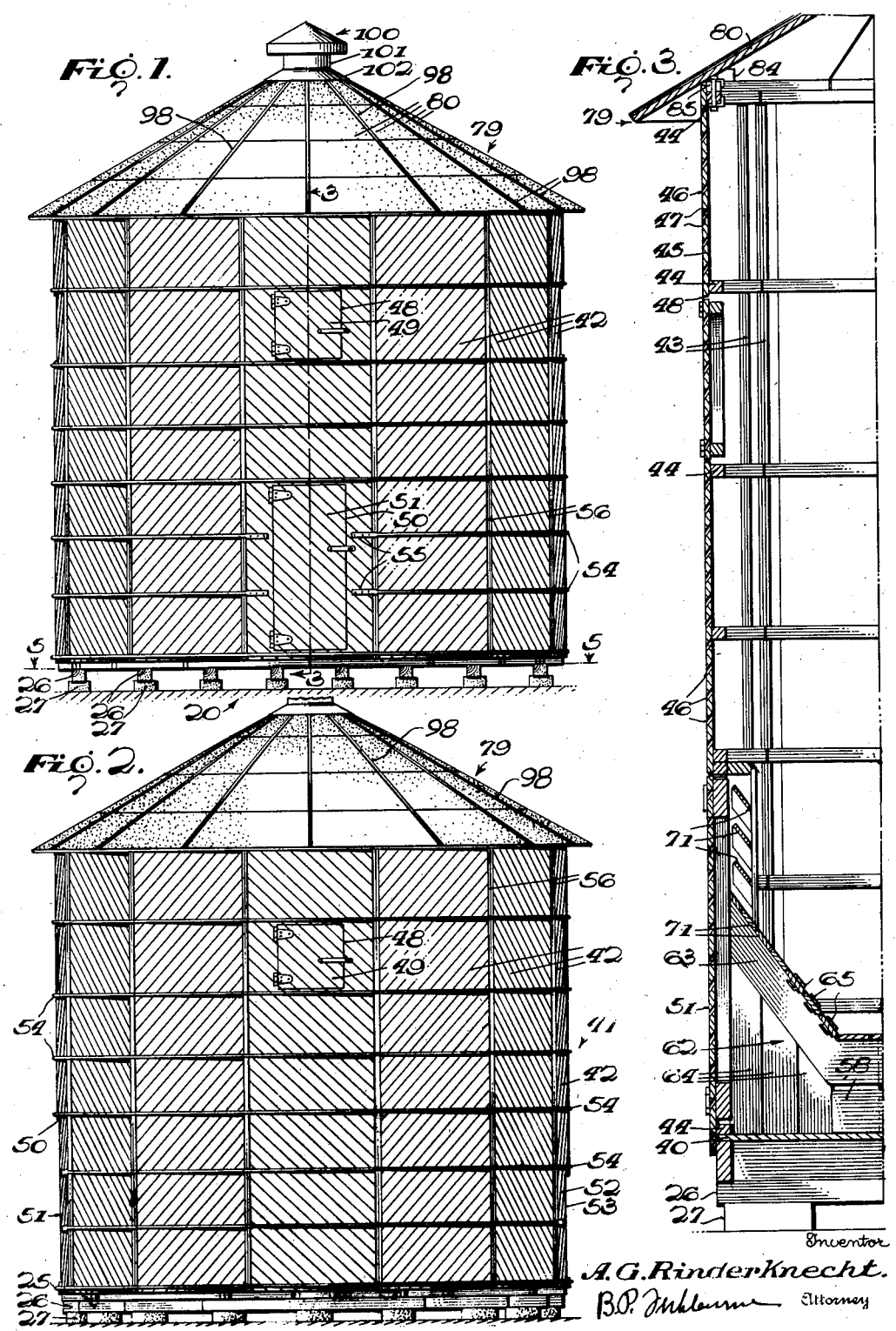

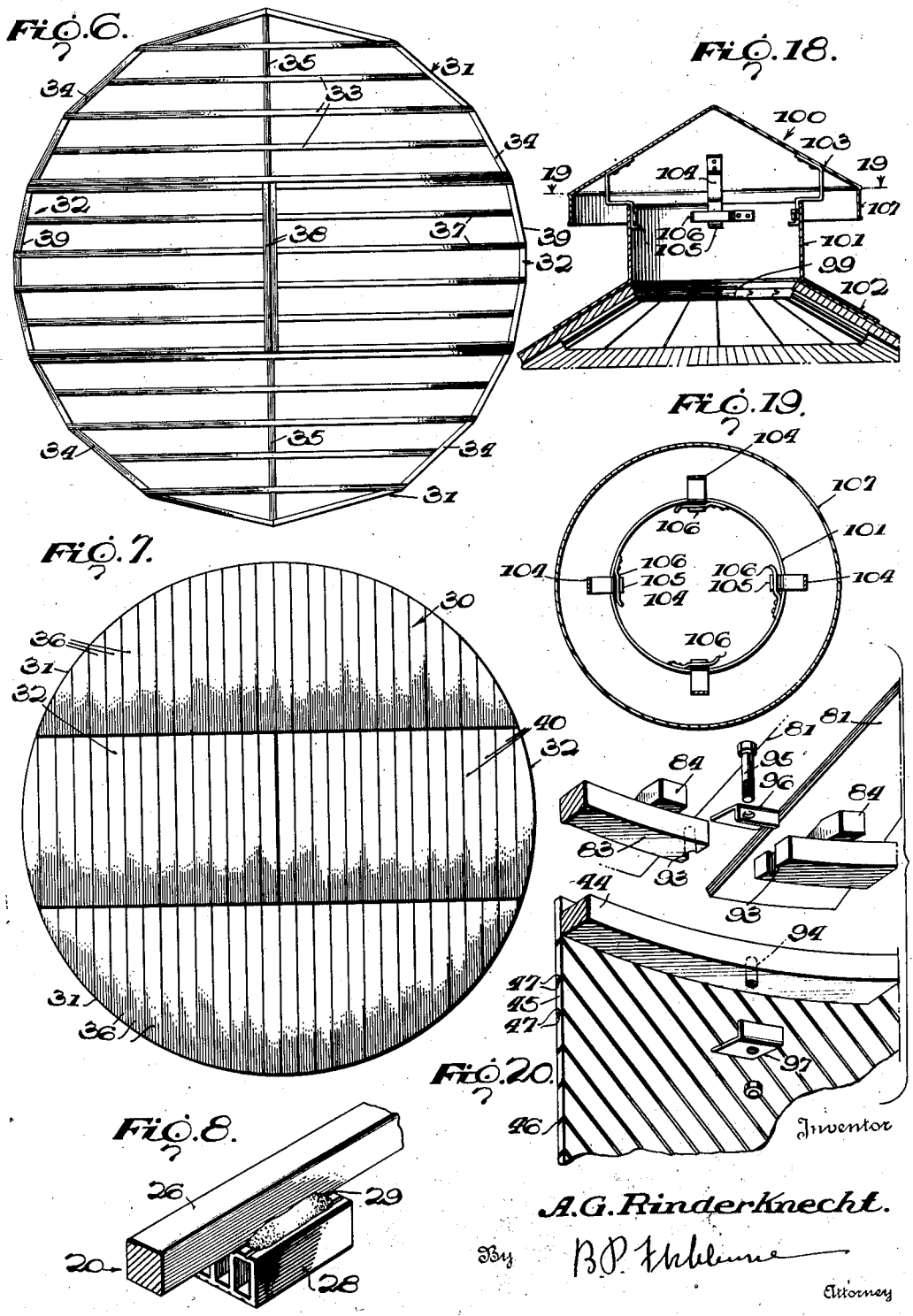

Dec. 29, 1942.  A. G. RINDERKNECHT  2,306,468
CORN CRIB OR THE LIKE
Filed Feb. 20, 1940  4 Sheets-Sheet 4
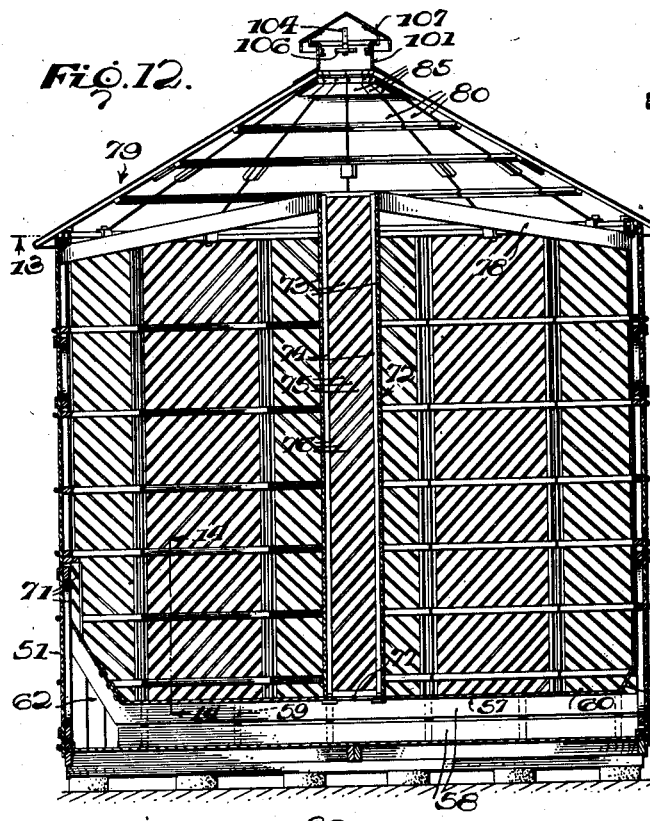
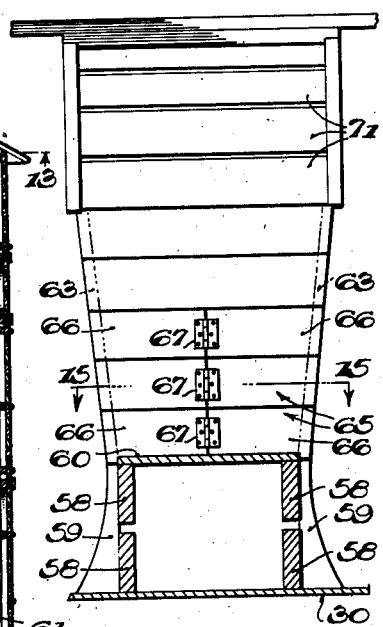
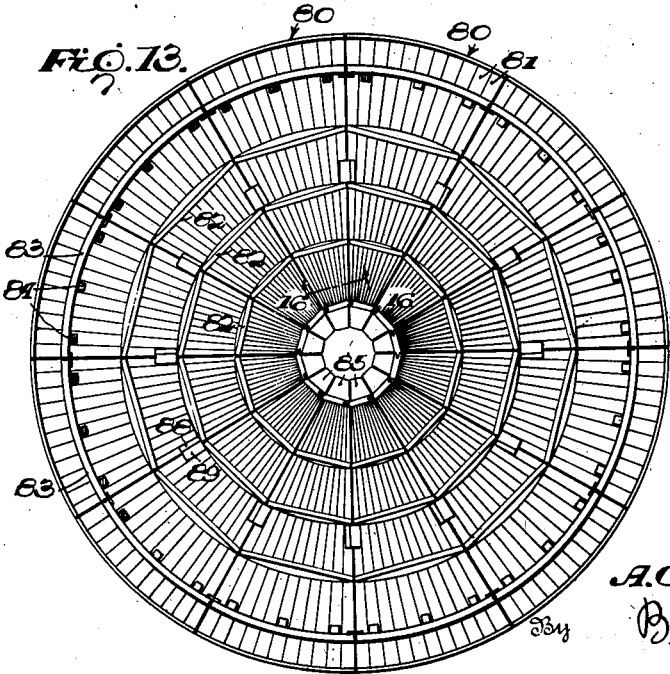
A.G. Rinderknecht Patented Dec. 29, 1942

2,306,468

UNITED STATES PATENT OFFICE 2,306,468

CORNCRIB OR THE LIKE

Arthur G. Rinderknecht, Atkins, Iowa

Application February 20, 1940, Serial No. 319,948

12 Claims. (Cl. 20—1.2)

My invention relates to cribs designed particularly for holding corn while the same may be used to hold other grain.

An important object of the invention is to provide a crib of the above mentioned character which is formed in separate sections, for shipment in a compact manner, and which may be readily assembled at the place of use.

A further object of the invention is to provide a crib of the above mentioned character adapted to afford adequate ventilation for the corn or the like, but preventing the rain from entering the crib.

A further object of the invention is to provide means for affording adequate ventilation to the center of the crib.

A further object of the invention is to provide means whereby a portion of the ventilating device also serves to receive the drag-line of the sheller.

A further object of the invention is to provide means for permitting of the convenient removal of the corn from the crib.

A further object of the invention is to provide means for feeding the corn into the crib through the cupola or ventilator at the top of the crib.

A further object of the invention is to provide a floor construction of such a character that the floor proper is spaced from the ground, permitting of the circulation of air beneath the floor, thereby preserving the floor as well as preventing rats and other vermin from taking up a location beneath the crib.

A further object of the invention is to provide simple and reliable means for locking the roof sections to the side sections.

Other objects and advantages of the invention will be apparent during the course of the following description.

In the accompanying drawings forming a part of this application and in which like numerals are employed to designate like parts throughout the same, Figure 1 is a front elevation of a corn crib or the like, Figure 2 is a side elevation of the same, Figure 3 is an enlarged vertical section taken on line 3—3 of Figure 1, Figure 4 is a rear elevation of the crib, Figure 5 is a plan view of the foundation portion, viewed from line 5—5 of Figure 1, Figure 6 is a plan view of the frames of the floor sections, Figure 7 is a similar view of the assembled floor sections, Figure 8 is a perspective view of one of the beams of the foundation section and a hollow tile, Figure 9 is an inner side elevation of one of the side sections, Figure 10 is a horizontal section taken on line 10—10 of Figure 9, Figure 11 is a horizontal section taken on line 11—11 of Figure 4, Figure 12 is a central vertical section taken on line 12—12 of Figure 4, Figure 13 is a horizontal section taken on line 13—13 of Figure 12, Figure 14 is a transverse section taken on line 14—14 of Figure 12, Figure 15 is a horizontal section taken on line 15—15 of Figure 14, Figure 15ª is an outer side elevation of one of the removable doors, Figure 16 is a detailed section taken on line 16—16 of Figure 13, Figure 17 is a perspective view of the guide-blocks, Figure 18 is a central vertical section through the cupola, Figure 19 is a horizontal section taken on line 19—19 of Figure 18, and, Figure 20 is an exploded perspective view of the roof sections and side section and associated elements.

In the drawings, wherein for the purpose of illustration is shown a preferred embodiment of my invention, the numeral 25, Figure 1, designates a foundation construction embodying spaced horizontal beams 26, arranged upon blocks 27, spaced as shown. The number of blocks employed may be varied, as found advantageous. The blocks in the several sets or rows are preferably staggered. The blocks 27 retain the beams 26 spaced from the ground and the blocks provide the maximum ventilation beneath the horizontal beams 26. This arrangement preserves the beams 26 and also prevents rats and other vermin from taking up their habitation beneath the crib. Instead of employing blocks 27, I may use hollow tile 28, and when this is done I provide a mortar joint 29, Figure 8.

The floor 30 is arranged upon this foundation construction and this floor is formed in separable sections 31 and 32, adapted when assembled to produce a circular unit. Each floor section 31 comprises longitudinal beams 33, connected with marginal beams 34 and inner beams 35. Each floor section 31 comprises boards 36, arranged transversely of the longitudinal beams 33 and nailed or otherwise secured thereto. The boards or sheathing 36 are assembled in close contacting relation and may be tongue and grooved, if desired. Each of the inner sections 32 comprise longitudinal beams 37, connected at their inner ends by a transverse beam 38 and at their outer ends by transverse beams 39. Boards or sheathing 40 are arranged transversely of the beams 37 and are secured thereto by nails or the like. The boards or sheathing 40 are assembled in contacting relation and may be tongue and grooved, if desired. The floor sections 31 and 32 are arranged upon the beams 26 in an assembled circular group, and the longitudinal beams of these floor sections extend transversely of or at a right angle to the beams 26. These floor sections 31 and 32 may be secured together, if desired, and they may be secured to the beams 26, if desired, by nailing or otherwise.

The crib comprises a preferably cylindrical body portion or side 41. This body portion is mounted directly upon the floor. The body portion comprises a plurality of side sections 42, which are cylindrically curved in horizontal sections. Each side section comprises a rectangular framework including vertical longitudinal studs 43 and transverse purlins 44, which are rigidly connected. Rigidly secured to this framework by nails or the like are slats or cribbing 45. The slats are diagonally arranged. The slats in each side section are spaced a suitable distance, to provide slots 46 for ventilation and the edges of the slats are inclined downwardly in an outward direction, as shown at 47 whereby the rain cannot enter the crib. The slats or cribbing 45 of one side section 42 are inclined in an opposite direction to the inclination of the slats or cribbing in the next side section, whereby the sets of slats present a zig-zag formation. Certain of the side sections 42 are provided near and spaced from its upper end with an opening 48, adapted to be covered by a scoop door 49. Two pairs of the side sections 42 may have these doors, the side sections in each pair being diametrically oppositely arranged. One of these side sections will be arranged at the front of the crib and the other side section in the same pair at the back, while the remaining two side sections with the door 49 will be disposed at 90° from the front and rear side sections. The front side section 42 is provided with a main or large door opening 50, adapted to be covered by a door 51 and this opening 50 is arranged adjacent to the lower end of the front side section. The rear side section is provided at its bottom with a smaller opening 52 to be covered by a door 53. The other side sections have no lower door openings formed therein.

When the side sections are assembled upon the floor, the lowermost purlins 44 rest upon the top of the floor, while the diagonal slats or cribbing 45 project downwardly below and about the floor, thus preventing the lower ends of the side sections from being drawn inwardly beyond the circumference of the floor. The assembled side sections are held in position by circularly curved rods 54. The ends of these rods are secured together by rod fasteners 55.

The meeting edges of the side sections may be covered by strips 56, notched at the purlins, to receive the rods 54. The horizontal rods 54 are thereby held in alinement with the purlins 44, as shown in Figure 12. The meeting ends of the purlins 44, Figures 11 and 12, contact or substantially contact and the rods 54 being in alinement with the purlins and exerting an inward pressure upon the side sections, produce a rigid construction.

Means are provided to ventilate the interior of the crib comprising a horizontal trench or passage forming housing 57. This housing includes sides formed of boards 58, Figures 3, 12 and 14, rigidly secured to vertical studs 59. The sides carry sheathing 60, rigidly attached thereto by nailing or the like and the sheathing is arranged in contacting relation to prevent the shelled corn from passing into the housing. The housing is mounted upon the floor and extends diametrically thereof with its rear end in communication with the opening closed by the rear door 53. There is an inclined board 61 at the rear end of the housing 57, as shown. The forward end of the housing 57 is in alignment with the front opening covered by the front door 51 but is spaced from the front opening 50, forming a passage 62. This passage is covered by an auxiliary housing which leads to the opening 50. This auxiliary housing includes inclined beams 63, extending from the upper boards 58. The sides of the passage 62 are covered by vertical boards 64, attached to the beams 63. The beams 63 are inclined upwardly and project above the housing 57 for a substantial distance. Arranged upon the beams 63 in contacting relation are small doors 65. Each of these doors includes sections 66 provided upon their inner sides with hinges 67, which connect them. The sections 66 are therefore adapted to break outwardly, and are held against such movement by a latch 68, attached to one section at 69, upon its outer side, for detachable engagement with a keeper 70 secured to the companion section. By separating the latch 68 from its keeper each door 65 may be removed, and this will permit the corn to drop into the passage 62. The sheller drag line is adapted to operate within the housing 57 and will engage the ears of corn dropping into the passage 62 and conduct the same to the sheller. The beams 63 do not extend upwardly to the top of the door opening 50 and the remainder of this opening may be covered by slats or cribbing 71, as shown.

The numeral 72 designates a vertical ventilator-housing arranged centrally within the crib. This ventilator-housing is preferably rectangular and is formed of four sides 73. Each side comprises a pair of vertical studs 74, and diagonal slats or cribbing 75, nailed thereto. These diagonal slats or cribbing are spaced to provide slots 76 for ventilation. The sides are assembled and secured together by any suitable means. The bottom of the ventilator-housing is arranged directly over a central opening 77, formed in the floor 57. Attached to the top of the ventilator-housing 72 are braces 78, secured to the body portion of the crib. The top of the ventilator-housing 72 is spaced from the top of the roof, to be described.

The roof is designated as a whole by the numeral 79, and includes segmental roof sections 80, corresponding in number to the side sections. Each segmental roof section is formed of a suitable number of boards 81, which are mounted upon transverse roof braces or bars 82 and are nailed or otherwise secured thereto. The bars or braces 82 have their sides next to the roof curved to fit the contour of the roof. A horizontal transverse curved purlin 83 is arranged near and spaced from the bottom of the roof section and is rigidly attached to the roof section and blocks 84 are arranged between the purlin and the roof section to maintain the desired pitch of the roof section with relation to the purlin. Attached to the upper reduced end of each roof section is a block 85, disposed inwardly of the same. This block is provided upon one edge with a tongue 86 and with a groove 87 upon its opposite edge. The assembled blocks 85 therefore interlock producing a rigid joint. Each roof section is provided near a point equidistantly spaced from its ends with guide-blocks 88 and 89, rigidly secured thereto. These guide-blocks have inclined edges 90. The block 88 projects outwardly beyond the roof section while the inclined face 90 of the block 89 has its upper edge arranged inwardly of the edge of the roof section.

When the roof sections are assembled upon the body portion of the crib, the blocks 88 and 89 serve as guides, and when they register the adjacent roof sections are in their proper position. The several blocks 85 interlock, and the block 88 of one section interlocks with the block 89 of the adjacent roof section. The assembled roof purlins 83 are arranged upon the uppermost purlins 44 of the side sections. The roof sections are arranged to break joint with the side sections, so that the meeting ends of each pair of roof purlins 83 are arranged at the central longitudinal axis of each side section. The meeting ends of the roof purlin sections 83, Figure 20, have notches 93. The uppermost side purlin 44 has an opening 94, disposed at its central longitudinal axis. A bolt 95 passes through the notches 93 and opening 94 and through openings in cleats or clamps 96 and 97, which are L-shaped in cross-section. In this manner, the meeting ends of the roof purlins are locked together and to the uppermost side purlins 40, at the central longitudinal axes of the side sections. Metal battens 98 preferably cover the meeting edges of the roof sections. The assembled roof sections may be covered by any suitable roofing material, such as asphalt roll roofing or the like.

The assembled roof sections provide a central opening 99 in the roof, which is covered by a ventilator or cupola 100, formed of metal or the like. This cupola includes a cylindrical body portion 101, carrying a downwardly flaring flange 102, having the angle of slope of the roof so that the flange 102 will lie flat upon the top end of the roof and may be rigidly attached thereto by any suitable means. The cupola includes a cap 103 which is removable, and this cap includes locking arms 104, arranged within the cap and attached thereto, and these locking arms have horizontal extensions 105. Horizontal keepers 106 are rigidly attached to the inner side of the body portion 101. The lower ends of the locking arms 104 engage within the keepers 106 and the flanges 105 engage beneath them. A depending annular flange 107 is carried by the cap 103 and extends down below the top of the body portion 101, to prevent the entrance of rain into the body portion, but not preventing ventilation. An important feature of this ventilator or cupola is that the cap 103 may be removed and the spout of a grain elevator inserted into the body portion 101 of the cupola for filling the crib or granary. When this is done, a cap is placed over the top of the ventilator-housing 72 to prevent the corn from entering the same. In view of the foregoing description it is obvious that the crib or granary is formed in sections which may be transported in a knock-down condition and then assembled at the desired place. The rear door 53 may be opened which will permit of the circulation of air into and through the housing 57 and this air will pass through the opening 77 into the vertical ventilator-housing 72, entering the crib and finally passing to the exterior of the same through the cupola. When it is desired to remove the corn or grain, the main door 51 may be opened, and by removing one or more of the small doors 65, the corn will fall into the passage 62 and may be removed therefrom by the sheller drag line, passing to the corn sheller. By opening the door 51 without removing the smaller doors 65 air may also enter the adjacent end of the horizontal housing 57. Access may also be had to the upper portion of the crib by opening the smaller scoop doors 59.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. A roof for a corn crib or the like comprising separable segmental roof sections tapering inwardly, a block secured to the reduced inner end of each roof section, the block having a tongue and a groove, the blocks interlocking and forming an annular group affording an opening at the center of the roof, a cupola covering the central opening and secured to the roof sections adjacent to the blocks.

2. A roof for a corn crib or the like comprising separable segmental roof sections tapering inwardly, blocks secured to the inner ends of the roof sections and having means for interlocking engagement, and guide-blocks secured to each roof section intermediate the ends thereof, said guide-blocks having outer inclined edges.

3. A corn crib or the like comprising, a body portion including side sections, each side section comprising a frame and diagonal strips secured thereto, the strips in alternate side sections being inclined in an opposite direction so that the strips of the several side sections have a zig-zag formation, means to secure the side sections together, and a roof for the body portion.

4. A corn crib or the like comprising, a floor, a body portion arranged upon the floor and including separable side sections having upper purlins, a roof mounted upon the body portion and including separable roof sections having lower purlins, the roof sections being staggered with respect to the side sections so that the meeting ends of the roof section purlins are disposed near the centers of the side section purlins, the meeting ends of the roof section purlins having notches formed therein to produce openings, the intermediate portions of the side section purlins having openings formed therein, a cleat covering the meeting ends of each pair of roof section purlins and having an opening formed therein, and a bolt passing through the opening of each cleat and through the opening formed by the pair of notches in the roof section purlins and through the opening formed in the side section purlin.

5. A corn crib or the like comprising, a body portion including separable side sections having upper purlins, a floor for the body portion, a roof mounted upon the body portion and including separable roof sections having lower purlins, the roof sections being staggered with respect to the side sections so that the meeting ends of the roof section purlin are disposed near the centers of the side section purlins, the meeting ends of the roof section purlins having notches to form openings, the side section purlins having center openings adjacent to the first named openings, a cleat having an opening and covering the meeting ends of each pair of roof section purlins, a cleat having an opening and arranged beneath each side section purlin, and a bolt passing through the openings in said cleats and through the openings formed by the notches of the roof section purlins and through the opening in the side section purlin and serving to clamp the cleats in place.

6. A corn crib or the like comprising a floor, a body portion including separable side sections, each side section including a frame having upper and lower purlins and diagonally arranged strips secured to the frame, the side sections being assembled upon the floor and having their lower purlins supported by the floor, generally horizontal bands surrounding the side sections and holding them in the assembled relation to produce the body portion, a roof mounted upon the body portion and including separable tapered roof sections, each roof section having a lower purlin, the assembled roof sections having their lower purlins supported by the upper purlins of the side sections, and means to secure the roof section purlins to the side section upper purlins.

7. A corn crib or the like comprising a body portion including separable side sections, each side section including a frame, said frame including substantially vertical studs and substantially horizontal purlins, diagonally arranged strips secured to the frame and extending beyond the studs, the assembled side sections having the stud of one side section spaced from the stud of the adjacent side section, and generally horizontal bands surrounding the assembled side sections and holding the same in place.

8. A corn crib or the like comprising a body portion including separable side sections, each side section including a frame, said frame including substantially vertical studs and substantially horizontal purlins which extend outwardly beyond the studs, diagonally arranged strips secured to the frame, the assembled side sections having the ends of the purlins of one side section in substantial meeting relation with the ends of the purlins of the adjacent side section while the stud of one side section is spaced from the stud of the adjacent side section, and generally horizontal bands surrounding the assembled side sections and holding the same in place.

9. A corn crib or the like comprising a body portion including separable side sections, each side section including a frame, said frame including substantially vertical studs and substantially horizontal purlins which extend outwardly beyond the studs, diagonally arranged strips secured to the frame, the assembled side sections having the ends of the purlins of one side section substantially contacting with the ends of the purlins of the adjacent side section while the stud of one side section is spaced from the stud of the adjacent side section, and generally horizontal bands surrounding the assembled side sections and arranged in substantial alinement with the purlins.

10. A corn crib or the like comprising a body portion including separable side sections, each side section including a frame, said frame including substantially vertical studs and substantially horizontal purlins which extend outwardly beyond the studs, diagonally arranged strips secured to the frame and extending outwardly beyond the studs, the assembled side sections having the ends of the purlins of one side section in substantial contacting relation with the ends of the purlins of the adjacent side section while the stud of one side section is spaced from the stud of the adjacent side section, substantially vertical strips covering the meeting edges of the side sections and having notches adjacent to the purlins, and generally horizontal bands surrounding the side sections and held within the notches to be in substantial alinement with the purlins.

11. A corn crib or the like comprising a body portion including separable side sections, each side section including a frame having substantially horizontal purlins, the purlins of the assembled side sections being in substantial alinement, a roof mounted upon the body portion and including separable tapered roof sections, each roof section having a lower substantially horizontal purlin, the roof sections being arranged to break joint with the side sections, the purlins of the roof section resting upon the uppermost purlins of the side sections and the meeting ends of the roof section purlins being disposed near the intermediate portions of the uppermost side section purlins, means to clamp the meeting ends of the roof section purlins together and to the uppermost side section purlins, and substantially horizontal bands surrounding the side sections and in substantial alinement with the purlins of such side section.

12. A corn crib or the like comprising a body portion including separable side sections, each side section including a frame, said frame including substantially vertical studs and substantially horizontal purlins which extend outwardly beyond the studs, strips secured to the frame, the assembled side sections having the ends of the purlins of one side section in substantial meeting relation with the ends of the purlins of the adjacent side section while the stud of one side section is spaced from the stud of the adjacent side section, and means to secure the side sections together.

ARTHUR G. RINDERKNECHT.